United States Patent [19]

Takahashi et al.

[11] Patent Number: 5,675,683
[45] Date of Patent: Oct. 7, 1997

[54] OPTICAL COUPLER CONSTRUCTED USING OPTICAL FIBER FERRULES

[75] Inventors: Mitsuo Takahashi; Kunio Yamada; Yuying Wu, all of Matsudo, Japan

[73] Assignee: Seikoh Giken Co., Ltd., Chiba-ken, Japan

[21] Appl. No.: 559,286

[22] Filed: Nov. 15, 1995

[30] Foreign Application Priority Data

Jan. 13, 1995 [JP] Japan .................. 7-021032
Mar. 31, 1995 [JP] Japan .................. 7-100667

[51] Int. Cl.$^6$ .................. G02B 6/04; G02B 6/38
[52] U.S. Cl. .................. 385/78; 385/74
[58] Field of Search .................. 385/34, 39, 46–47, 385/51–52, 54, 60–61, 78–80, 82, 74

[56] References Cited

U.S. PATENT DOCUMENTS

| | | | |
|---|---|---|---|
| 4,213,677 | 7/1980 | Sugimoto et al. | 385/61 |
| 4,666,238 | 5/1987 | Borsuk et al. | 385/78 |
| 4,733,931 | 3/1988 | Fan . | |
| 4,880,289 | 11/1989 | Imoto et al. | 385/61 |
| 4,925,267 | 5/1990 | Plummer et al. . | |
| 4,989,946 | 2/1991 | Williams et al. | 385/78 |
| 5,050,954 | 9/1991 | Gardner et al. | 385/16 |

FOREIGN PATENT DOCUMENTS

| | | |
|---|---|---|
| 437 040 | 7/1991 | European Pat. Off. . |
| 2 221 058 | 1/1990 | United Kingdom . |
| 2239719 | 7/1991 | United Kingdom . |

*Primary Examiner*—John D. Lee
*Assistant Examiner*—Ellen Eunjoo Kang
*Attorney, Agent, or Firm*—Spencer & Frank

[57] ABSTRACT

An optical coupler is formed comprising a pair of optical fiber ferrules having four optical fibers fastened within a throughhole in the ferrule, a pair of contiguous graded index rod lenses, and a thin film between the graded index rod lenses which partially transmits incident light and reflects the remainder. One ferrule is attached to one graded index rod lens and another ferrule is attached to the other graded index rod lens. The central axes of the ferrules are aligned to the optical axes of the graded index rod lenses. The optical axis of each optical fiber in one ferrule is aligned to the optical axis of a corresponding optical fiber in the other ferrule by rotating the former ferrule around its optical axis so that the four optical fibers of the ferrule are symmetrically arranged with respect to the optical axis of the graded index rod lens to which the ferrule is attached. The ferrules, graded index rods lenses and thin film are fastened together.

15 Claims, 7 Drawing Sheets

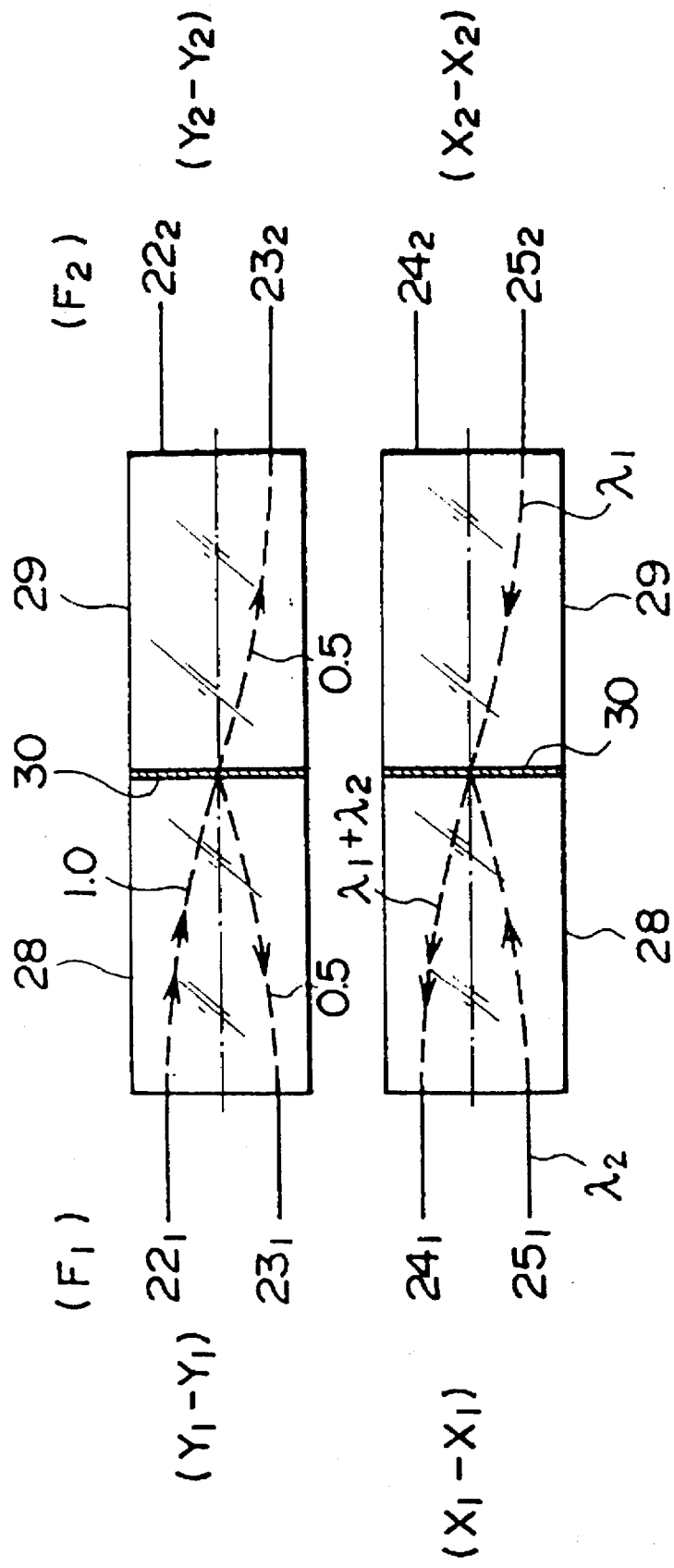

OPTICAL COUPLER CONSTRUCTED USING OPTICAL FIBER FERRULES

BACKGROUND OF THE INVENTION

1. Field of the Invention

The present invention relates to an optical fiber ferrule with four-core optical fibers for use as an optical component, a bidirectional optical coupler for full-duplex optical communication wherein a pair of lightwaves at different wavelengths are concurrently transmitted in opposite directions, and an optical coupler for use as a unidirectional optical multiplexer/demultiplexer.

2. Related Art

Described hereafter is the structure of an optical coupler known in the prior art, which consists of two graded index rod lenses, and a wavelength division multiplexing means having non-uniform spectral responsive filtering and a reflection surface.

FIG. 10 shows in principle the structure of the bidirectional optical coupler using the above mentioned optical coupling structure. FIG. 11 Shows in principal the structure of the unidirectional optical splitter.

Since the optical coupler commonly used consists of the structures of FIGS. 10 and 11, the optical coupler structure will be described hereafter.

Graded index rod lenses 1 and 2 have the same axial length ($Z_1=Z_2=0.25$ pitch). These graded index rod lenses are available in the market as selfoc® lenses sold by Nihon Ita Glass Co., Ltd.

Dielectric material layers are deposited on the surface of a glass plate 3 so that the reflection and transmission coefficients have different spectral responses. The glass plate 3 transmits the lightwave at a first wavelength $\lambda_1$ and reflects the lightwave at a second wavelength $\lambda_2$.

Optical fibers 6A through 6C are connected to the outer surfaces of graded index rod lenses 1 and 2 as shown in FIG. 10.

The end-faces of optical fibers 6A through 6C are accurately fastened by an epoxy resin 5 to the graded index rod lenses 1 and 2 on lines Y–Y' (FIGS. 12a and b) passing through the vertical optical axis of each rod lens at the same distance ($r_1=r_2=r_3$) from the central optical axis of each rod lens.

The lightwave power generated at a wavelength of $\lambda_1$ from a laser diode light source 8 is incident on the bidirectional optical coupler of FIG. 10. The lightwave power is input through optical fiber 6A into the graded index rod lens 2.

The end-face of an optical fiber 6B is connected to an optical receiver 9 which consists of a photodiode.

The lightwave power at a second wavelength $\lambda_2$ is transmitted through an optical fiber 6C from left to right, reflected from the wavelength division multiplexing means consisting of the glass plate 3 and the dielectric layers 4, and is incident on the optical fiber 6B after passing back through the graded index rod lens 1 from right to left.

The lightwave at the first wavelength $\lambda_1$, which is fed from the laser diode light source 8 through the graded index rod lens 2, is transmitted to the optical fiber 6C through the wavelength division multiplexing means consisting of the glass plate 3 and dielectric layer 4, and then through the graded index rod lens 1.

The operation of the unidirectional optical multiplexer/demultiplexer will be described hereafter referring to FIG. 11. As described heretofore, the unidirectional optical coupler of FIG. 11 has the same structure as the bidirectional optical coupler of FIG. 10.

The combined lightwaves at wavelengths of $\lambda_1$ and $\lambda_2$ are incident on the graded index rod lens 1 after passing through the optical fiber 6C. The second lightwave power at a wavelength of $\lambda_2$ is reflected from the wavelength division multiplexing means consisting of the glass plate 3 and the dielectric layers 4. The first lightwave power at a wavelength of $\lambda_1$ is incident on the graded index rod lens 2 after passing through the division multiplexing means and then goes to the optical fiber 6A. The second lightwave power at a wavelength of $\lambda_2$, which is reflected from the wavelength division multiplexing means consisting of the glass plate 3 and the dielectric layer 4, passes back through the graded index rod lens 1 to the optical fiber 6B. This process is also reversible. If the lightwave at a wavelength of $\lambda_1$ is fed through the optical fiber 6A when the lightwave at a wavelength of $\lambda_2$ is fed through the optical fiber 6B, the combined lightwaves at wavelengths of $\lambda_1$ and $\lambda_2$ can be obtained from the optical fiber 6C.

There is a well known optical coupler fabricated by fusing and drawing a pair of attached optical fiber portions, which differs from that fabricated using a pair of graded index rod lenses. For instance, an optical coupler of the fusion and drawn type is disclosed in United Kingdom patent application number GB2239719A. An optical coupler fabricated based on the evanescent effect is produced and sold by Fujikura Co., Ltd.

The optical coupler of the fusion and drawn type has an isolation of 15 dB between a pair of wavelengths. An optical coupler of the graded index rod lens type has an isolation of 40 dB or more.

The optical coupler of the graded index rod lens type has a certain optical power splitting ratio which is independent of the light power wavelength. However, the optical coupler of the fusion and drawn type has an optical power splitting ratio which is dependent upon the light power wavelength.

The optical coupler of the graded index rod lens type has the additional defect that any alignment errors between optical fibers 6B or 6C and rod lens 1 and between optical fiber 6A and rod lens 2 cause a large insertion loss when the optical fibers 6A through 6C are connected to graded index rod lenses 1 and 2. The optical fibers 6A, 6B, and 6C are arranged at $r_1$, $r_2$ and $r_3$ distances from the central optical axes of the graded index rod lenses 1 and 2, respectively. Distances $r_1$, $r_2$ and $r_3$ are aligned at specified values plus (or minus) 1 to 2 μm or less. Each of the optical fibers 6A, 6B or 6C is fastened to the respective rod lens at specified points determined by line Y–Y' which passes through the central optical axis of rod lenses 1 and 2. If errors occur when the optical fibers 6A through 6C are fastened to rod lenses 1 and 2, excessive optical power losses are generated in proportion to these errors.

The optical fibers 6A through 6C are fastened to graded index rod lenses 1 and 2 by the epoxy resin 5 so that no error may occur. Since fabrication of the prior art coupler requires a number of processes, a high degree of skill, and great expense, the price of the product is necessarily high. If a laser power source having a large optical power capability is used with the optical coupler, the epoxy resin will be fatigued by the laser power from operation over a long period of time.

An experiment was carried out by the inventors of the present invention to solve the problems arising from fastening the optical fibers to the rod lenses using epoxy resin.

FIG. 13 shows a side view of the experimental setup. FIGS. 14a and b show the relation of a ferrule 14 and optical fibers 12 and 13. A pair of throughholes 10 and 11 are provided in ferrule 14 of FIG. 13. The optical fibers 12 and 13 are shown fastened to ferrule 14 on the lefthand side of FIG. 13. The optical fiber 13 is shown fastened to ferrule 14 on the righthand side of FIG. 13.

The pair of ferrules 14 are connected to the outer surfaces of graded index rod lenses 1 and 2 within throughhole 16 of alignment sleeve 15. Since a ferrule with a pair of throughholes could not be fabricated by machining, a sintered zirconia ceramic material was used in the experimental study.

When the zirconia ceramic material is sintered at a temperature of 1,500° C. or more, the sintered zirconia ceramic material shrinks by 20% or so in length. Variations in the length are at least ±2%. If the distance between throughholes 10 and 11 is 1 mm, dimensional errors are ±20 μm or so. The trial experiment was thus unsuccessful.

U.S. Pat. No. 4,989,946 discloses optical fiber switches constructed using ferrules with two optical fibers or seven optical fibers, which resemble the ferrule with four optical fibers of Applicants' invention, from an outside view. The difference between the ferrules of U.S. Pat. No. 4,989,946 and Applicants' invention will be described after the explanation of Applicants' invention.

As described heretofore, bidirectional optical couplers and unidirectional optical multiplexers/demultiplexers fabricated using graded index rod lenses have excellent optical performance. The connections of the graded index rod lenses to the optical fibers are, however, a cause for concern.

SUMMARY OF THE INVENTION

The first objective of the present invention is to provide a ferrule with four optical fibers, which can be successfully used as a component of an optical coupler.

The second objective of the present invention is to provide an optical coupler constructed using the ferrule and graded index rod lenses.

The present invention provides an optical fiber ferrule for an optical coupler having a throughhole whose center line is parallel to a reference on the ferrule. Four optical fiber elements are inserted from one end of the throughhole to the other end. The relation between the diameter of the end-face of the throughhole and the diameter of each of the optical fiber elements is defined by the following formula:

$$d=(2^{1/2}+1)d_1+\delta$$

where d: Diameter of the throughhole at the center of the ferrule end-face, $d_1$: Diameter of the optical fiber element, and δ: Allowance for errors on the order of microns.

In an optical fiber ferrule, the reference is on the outer cylindrical surface of the ferrule. The outer diameter of another optical component to which the end-face of the ferrule is to be connected has the same reference as the ferrule.

The present invention also provides an optical coupler consisting of first and second optical fiber ferrules, in each of which four optical fibers are tightly inserted into a throughhole at the center of the end-face of the respective cylindrical structure and fastened there, a pair of graded index rod lenses, a thin film which partly transmits incident light and reflects the remainder, and fastening means which locates the thin film at the interface between the pair of graded index rod lenses, connects the end-faces of the first and second optical fiber ferrules to the outer surfaces of the pair of graded index rod lenses, aligns the central axes of the optical fiber ferrules to the optical axes of the graded index rod lenses, aligns the optical axis of each optical fiber in the first ferrule to a corresponding optical fiber in the second ferrule by rotating the second ferrule around its optical axis so that the four optical fibers are symmetrically arranged with respect to the optical axis of the graded index rod lens, and fastens the above together.

In the optical coupler, the thin film transmits light power at first wavelength ($\lambda_1$) and reflects light power at second wavelength ($\lambda_2$) when incident light contains light power at both first and second wavelengths ($\lambda_1+\lambda_2$).

In the optical coupler, four optical fibers are used in one of the ferrules and two optical fibers are used in the other ferrule so that an optical coupler having a 1×2 circuit can be fabricated using a pair of lens units.

In the optical coupler, two of four optical fibers are used in one of the ferrules and one of four optical fibers is used in the other ferrule so that a 1×2 circuit is formed.

In the optical coupler, the thin film partially transmits incident light and reflects the remainder. The thin film is made of multiple layers of dielectric materials which are formed on the surface of a transparent sheet.

In the optical coupler, the fastening means consists of a cylindrical sleeve which aligns the optical axes in angle and radius.

In another embodiment of the optical coupler, the fastening means is constructed using a V-grooved block for aligning the optical axes in angle and radius.

BRIEF DESCRIPTION OF THE DRAWINGS

FIGS. 6a and 6b show the cross-sectional views of the graded index rod lenses and the thin film which are used to build the pair of 1×2 optical coupler of FIG. 4.

DETAILED DESCRIPTION OF THE PREFERRED EMBODIMENTS

Figure 1:
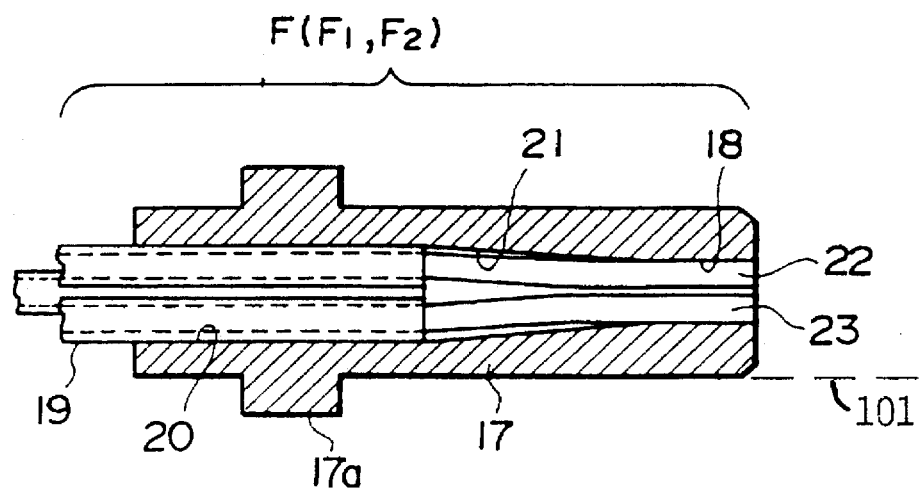
FIG. 1 shows a cross-sectional view of an embodiment of a ferrule built in accordance with the present invention.

The present invention will be described referring to the drawings.

In FIG. 1, the ferrule 17 consists of a cylinder made of a sintered zirconia ceramic material. The ferrule contains a throughhole made up of three parts 18, 21, and 20. The portion of the throughhole 18, with an inner diameter d=303 μm, is on the right side of the ferrule 17 in FIG. 1. In this embodiment, an outer cylindrical surface of the ferrule 17 includes a reference line 101. The central axis of the throughhole is parallel to the reference line.

Within the ferrule, this throughhole expands to accommodate optical fiber overcoats 19 as shown. The connecting hole 21 having a tapered surface at an inclination angle of 15 degrees or less connects the hole 20 to the smaller hole 18 at the end-face of the ferrule.

A flange 17a is provided on the left side of the ferrule. Optical fiber elements 22 through 25 (FIGS. 2a and 2b) are single-mode optical fiber elements with an outer diameter $d_1$ of 125 μm ($d_1$=125 μm), from which overcoats made of resin are removed.

The diameter of the throughhole on the right side, which can be seen from the end-face of ferrule 17, is expressed in terms of the diameter of the optical fiber elements as:

$$d=(2^{1/2}+1)d_1+\delta$$

where d: Diameter of the throughhole at the center of the ferrule, $d_1$: Diameter of the optical fiber element, and δ: Allowance for errors on the order of microns.

Allowance δ is 3μm or less (δ≦3 μm) in the present embodiment, provided that the diameter d of the throughhole 18 at the end-face of the ferrule is normally 303 μm (d=303 μm), and that diameter $d_1$ of the optical fiber element is nominally 125 μm ($d_1$=125 μm).

Figure 2A:
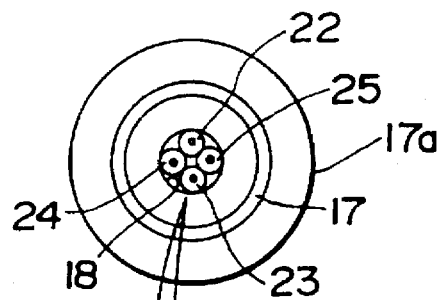
FIGS. 2a and 2b show an end-face of the embodiment of the ferrule.
Figure 2B:
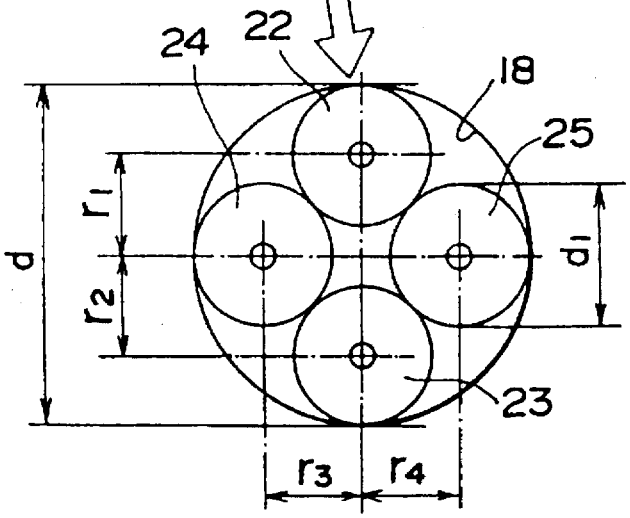

The outer surfaces of the optical fiber elements 22 through 25 are in contact with each other as shown in FIGS. 2a and 2b. Optical fiber elements 22 through 25 are also in contact with the inner diameter of the throughhole 18 within ferrule 17. By using two of these ferrules a pair of ferrules $F_1$ and $F_2$ with four optical fibers in each are thus formed.

Assuming that the inner diameter d of the throughhole 18 at the end-face of the ferrule is 303 μm (d=303 μm) and that the outer diameter $d_1$ of the respective single mode optical fiber element is 125 μm ($d_1$=125 μm), the distances $r_1, r_2, r_3,$ and $r_4$ from the central axis of ferrule throughhole 18 to the optical axes of optical fiber elements 22 through 25 are calculated to be 88.39 to 89.00 μm (See FIG. 2b). The calculation of the distance of the optical axis of each optical fiber element from the central axis of throughhole 18 has an error of 0.3 μm. The angle of the optical axis of an optical fiber element from the optical axis of another optical fiber element has an error of 0.004°, which corresponds to a length of 2.2 μm. These errors can be eliminated in a manner that will be described hereafter.

Figure 3:
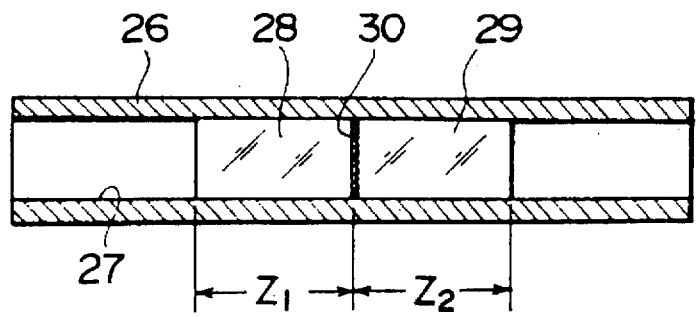
FIG. 3 shows a cross-sectional view of a pair of graded index rod lenses which are inserted into a cylindrical sleeve to illustrate a part of the first embodiment of the optical coupler built in accordance with the present invention.
Figure 4:
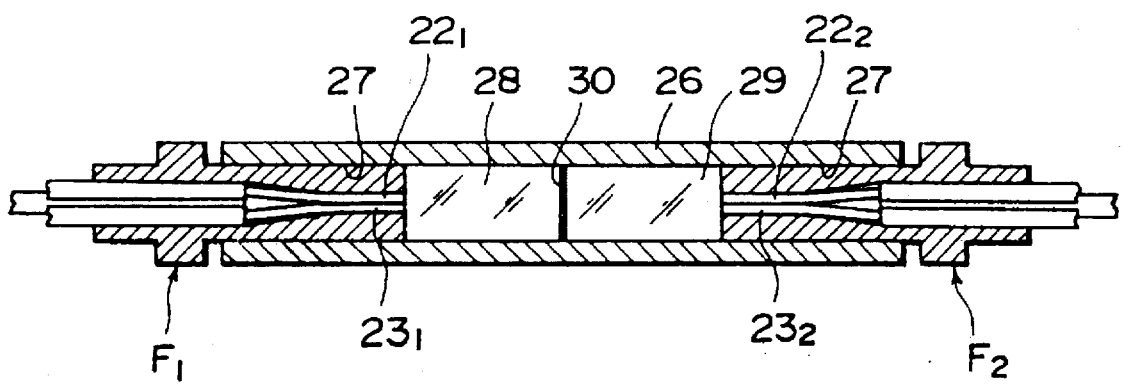
FIG. 4 shows a cross-sectional view of the pair of graded index rod lenses connected to a pair of ferrules, which are inserted into the cylindrical sleeve.

Consider the lens unit wherein an optical coupler is formed by the pair of ferrules $F_1$ and $F_2$ which are coupled together, each containing four optical fiber elements. FIG. 3 shows an embodiment of a graded index rod lens unit which may be used to form an optical coupler. FIG. 4 shows an embodiment of the optical coupler constructed using the lens unit of FIG. 3 combined with the ferrules.

A precise throughhole 27 is bored through a cylindrical sleeve 26 as shown in FIG. 3. The cylindrical sleeve 26 is made of sintered zirconia ceramic, phosphor bronze, or stainless steel. The sleeve 26 can be a slit sleeve wherein a slit is provided along the axis thereof. A pair of graded index rod lenses 28 and 29 with axial lengths ($Z_1$ and $Z_2$) of 0.25 pitch ($Z_1$=$Z_2$=0.25 pitch) are inserted into the throughhole 27 and placed at the center thereof.

The outer diameter of ferrules $F_1$ and $F_2$, each containing four optical fiber elements, is formed to precisely agree with the outer diameter of the graded index rod lenses 28 and 29.

A thin film 30 of multiple layers of dielectric materials is formed at the proximal surface on one side of either graded index rod lens 28 or 29 so that part of the incident light is reflected from the thin film 30 and the remainder is transmitted therethrough.

This thin film 30 may be independent of the light wavelength (for example, one which transmits 50% of the light power and reflects the other 50%), or it may be such that it can transmit the light power at a first wavelength ($\lambda_1$) and reflect the light power at a second wavelength ($\lambda_2$).

The process of assembling the rod lenses and the ferrules will be explained hereafter.

(First Step) A ferrule $F_1$ with four optical fiber elements is inserted into the throughhole 27 of the cylindrical sleeve 26 so that the end-face of the ferrule $F_1$ contacts the outer surface of the graded index rod lens 28. A ferrule $F_2$ with four optical fiber elements is inserted into the throughhole 27 of the cylindrical sleeve 26 so that the end-face of ferrule $F_2$ contacts the outer surface of graded index rod lens 29.

(Second Step) Either ferrule $F_1$ or $F_2$, each having four optical fiber elements, is rotated around the central axis of the ferrule until the optical axes of the four optical fibers of ferrule $F_1$ agree with those of ferrule $F_2$, respectively. These ferrules are to be fastened in this aligned position.

Figure 5B:
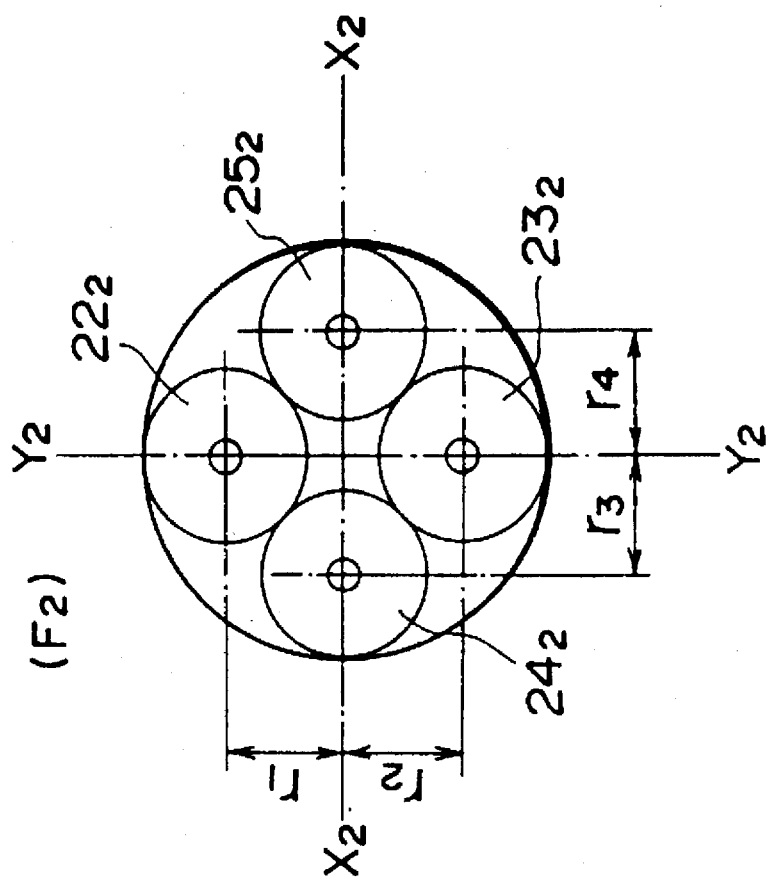
FIGS. 5a and 5b show an extended view of the end-faces of the ferrules to be used as the pair of 1×2 optical couplers of FIG. 4.
Figure 5A:
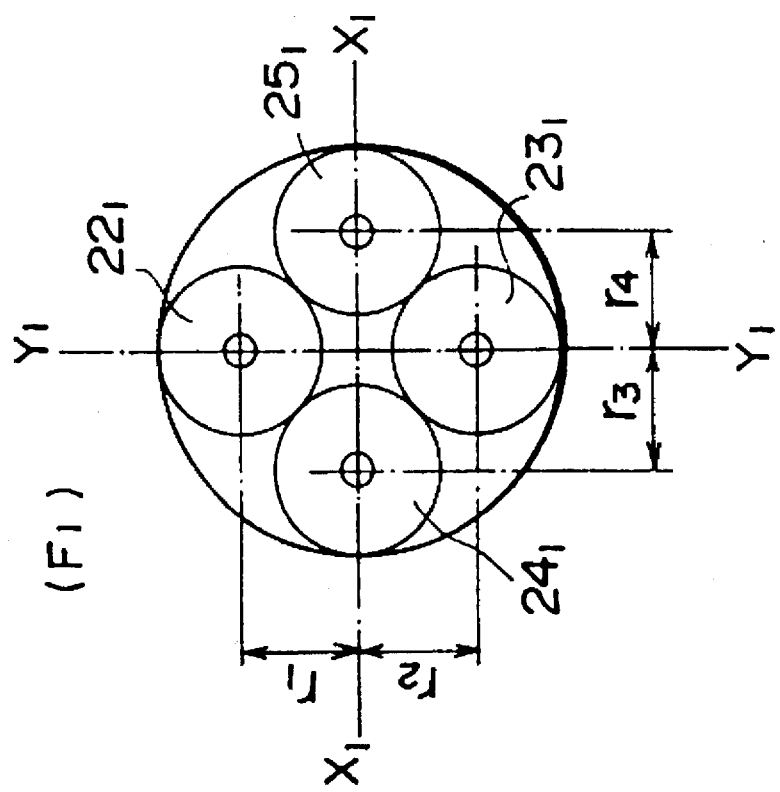

FIGS. 5a and 5b show cross-sectional views of ferrules $F_1$ and $F_2$ when used as a pair of 1×2 optical couplers. In FIGS. 5a and 5b, the extended end-faces of ferrules $F_1$ and $F_2$, each having four optical fiber elements, are seen from the graded index rod lenses.

For convenience in explaining the present invention, the optical fiber elements $22_1, 23_1, 24_1,$ and $25_1$ are assumed to be installed in the ferrule $F_1$, and the optical fiber elements $22_2, 23_2, 24_2,$ and $25_2$ are assumed to be installed in the ferrule $F_2$.

The center of optical fiber elements $22_1$ and $23_1$ in the ferrule $F_1$ lie on the plane $Y_1$—$Y_1$, and those of optical fiber elements $24_1$ and $25_1$ in the ferrule $F_1$ lie on the plane $X_1$—$X_1$. The plane $Y_1$—$Y_1$ is orthogonal to the plane $X_1$—$X_1$, crossing on the axial center line (the center of the throughhole 18 of the ferrule 17) of ferrule $F_1$.

The centers of the optical fiber elements $22_2$ and $23_2$ in ferrule $F_2$ lie on the plane $Y_2$—$Y_2$, and those of optical fiber elements $24_2$ and $25_2$ in ferrule $F_2$ lie on the plane $X_2$—$X_2$. The plane $Y_2$—$Y_2$ is orthogonal to the plane $X_2$—$X_2$, crossing on the axial center line (the center of the throughhole 18 of ferrule 17) of ferrule $F_2$.

The second step is carried out to make the plane $Y_1$—$Y_1$ agree with the plane $Y_2$—$Y_2$ (or to make the plane $X_1$—$X_1$ agree with the plane $X_2$—$X_2$).

FIGS. 6a and 6b show respectively cross-sectional views (cut along the planes $Y_1$—$Y_1$ and $Y_2$—$Y_2$ and planes $X_1$—$X_1$ and $X_2$—$X_2$) of the graded index rod lens 28, the thin film 30, and the graded index rod lens 29 in the optical coupler. In FIGS. 6a and 6b, the locations of the optical fibers in the ferrules are indicated by $22_1$ through $25_1$ and $22_2$ through $25_2$.

Assume that the thin film 30 reflects 50% of the incident light power independently of its wavelength and transmits the remaining 50% of the incident light power regardless of its wavelength.

The light power is transmitted to the graded index rod lens 28 after passing through the optical fiber $22_1$, and 50% of the incident light power is reflected from the thin film 30. The reflected light power goes back to the optical fiber $23_1$. The remaining 50% of the incident light power enters the optical fiber $23_2$, passing through the graded index rod lens 29.

Assume that the thin film 30 transmits the light power at a first wavelength ($\lambda_1$) and reflects another light power at a second wavelength ($\lambda_2$).

If the light power at second wavelength ($\lambda_2$) is fed to the optical fiber $25_1$ when the light power at first wavelength ($\lambda_1$) is fed to optical fiber $25_2$, the light powers at both the first and second wavelengths ($\lambda_1+\lambda_2$) enter the optical fiber $24_1$.

As described heretofore, up to two optical power combiners/splitters can be built using a pair of ferrules, each consisting of four optical fibers and a lens unit.

In the present embodiment, two of the optical fibers installed in the ferrule $F_1$ and one of the optical fibers in the ferrule $F_2$ are used. It is also possible for one optical fiber of the ferrule $F_1$ and two optical fibers of the ferrule $F_2$ to be used to build an optical combiner/splitter.

Since four optical fibers are installed in the throughhole of the ferrule so that the centers of the respective optical fibers are located the same distance from the center of the throughhole of the ferrule, the unused optical fibers are used to mechanically maintain the structure of the optical fiber assembly in the ferrule. The end-faces of the unused optical fibers are to be sealed.

The second embodiment of the present invention, i.e., an optical coupler wherein no sleeve is used, will be described hereafter.

Figure 7:
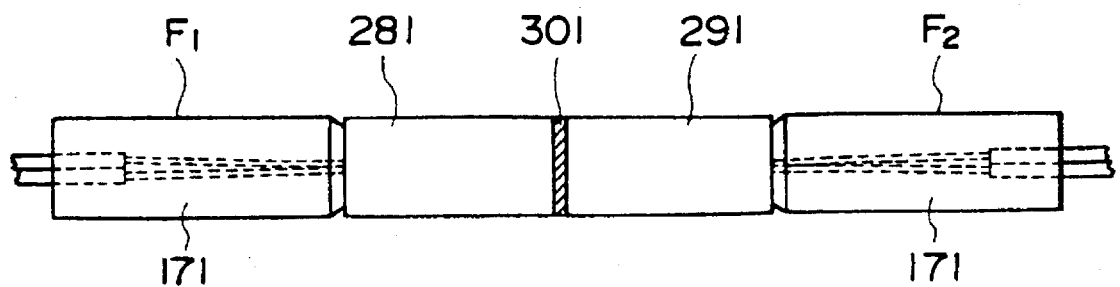
FIG. 7 shows a second embodiment of the optical coupler built in accordance with the present invention.
Figure 8A:
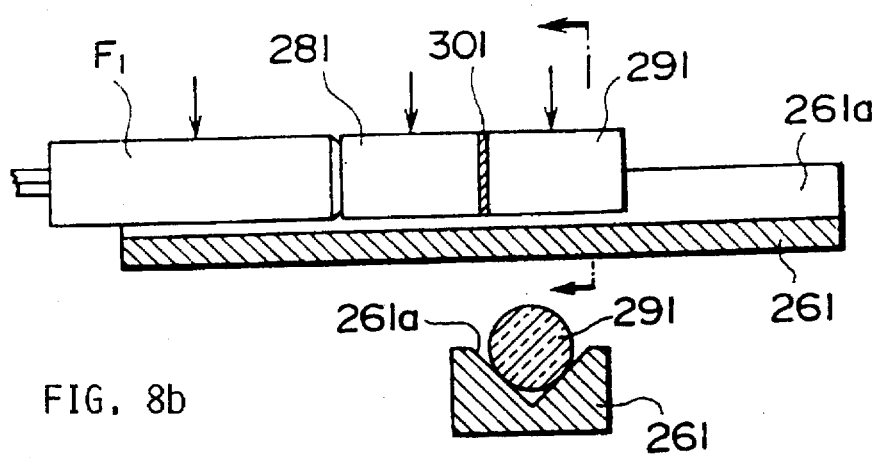
FIGS. 8a and 8b show a cross-sectional view demonstrating a fabrication process of the second embodiment of the invention.
Figure 8B:
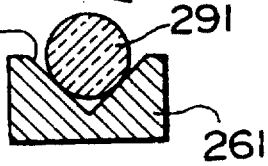
Figure 9:
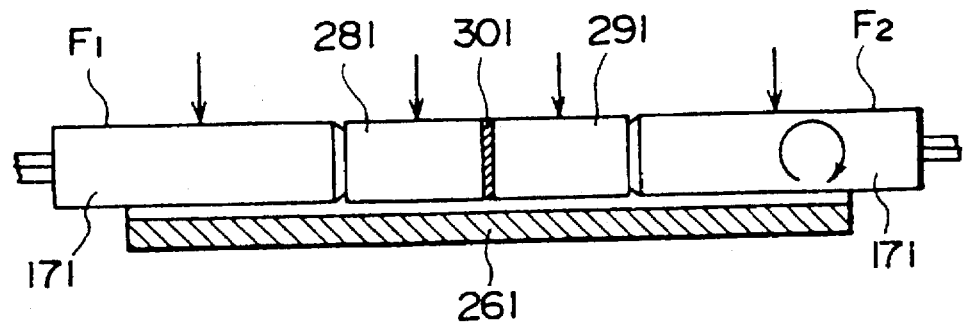
FIG. 9 shows a cross-sectional view demonstrating the adjustment processes of the second embodiment of the invention.
Figure 10:
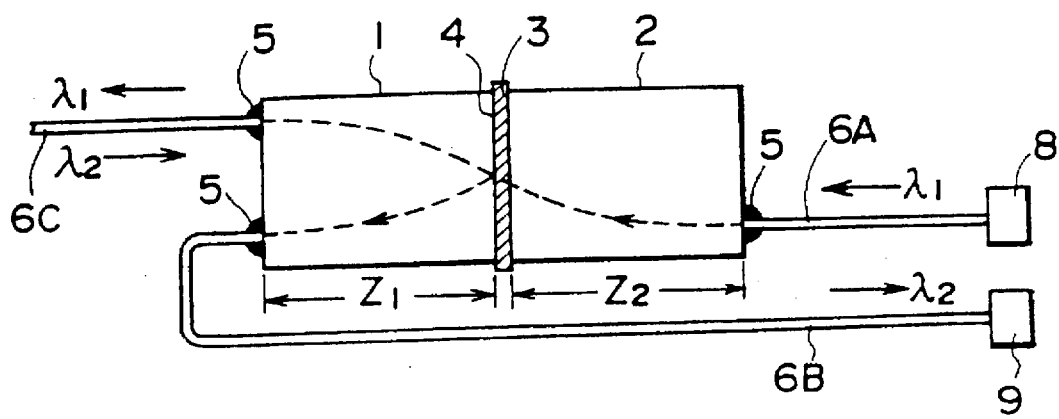
FIG. 10 shows a cross-sectional view of a conventional bidirectional optical coupler constructed using graded index rod lenses and a filter having a nonuniform spectral response.
Figure 11:
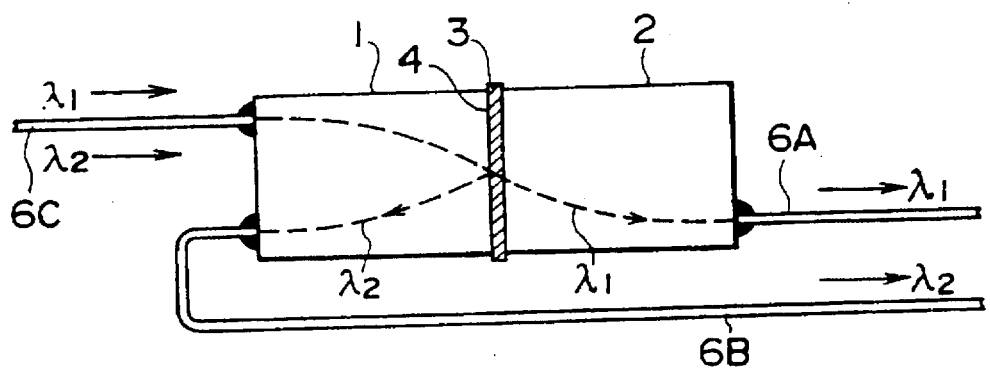
FIG. 11 shows a cross-sectional view of a conventional unidirectional optical wavelength division multiplexer constructed using graded index rod lenses and a filter having a nonuniform spectral response.
Figure 12A:
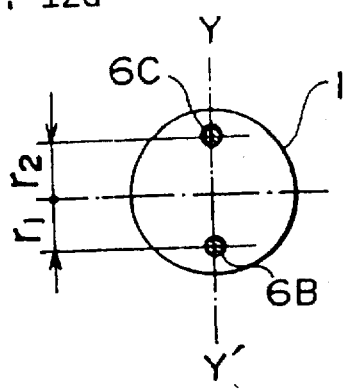
FIGS. 12a and 12b show cross-sectional views of the junctions between the graded index rod lenses and the optical fibers of the devices of FIGS. 10 and 11, respectively.
Figure 12B:
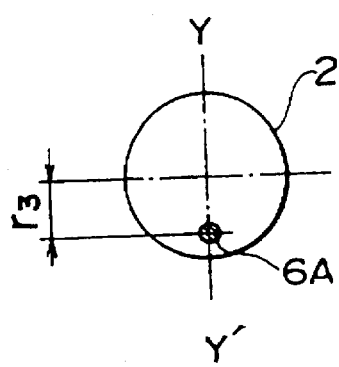
Figure 13:
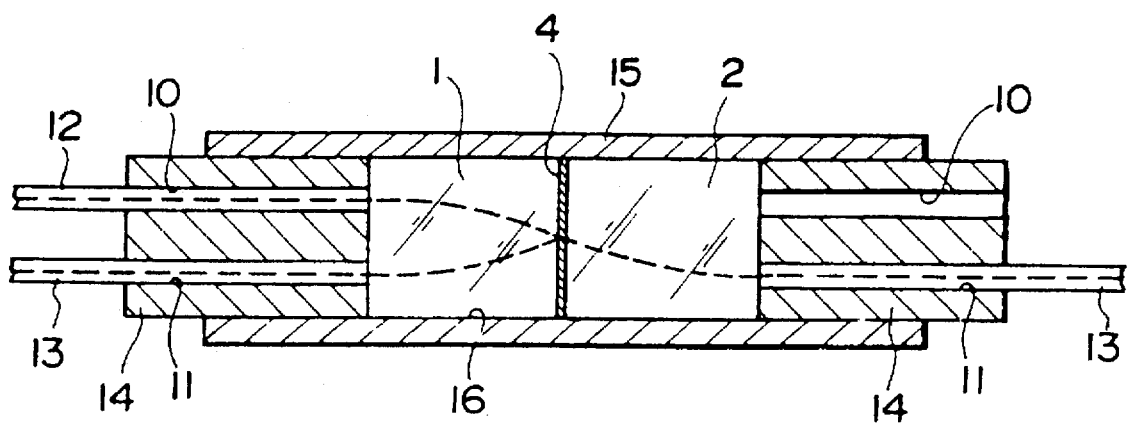
FIG. 13 shows a cross-sectional view of an improved device constructed by the inventors to solve the problems of the conventional device.
Figure 14A:
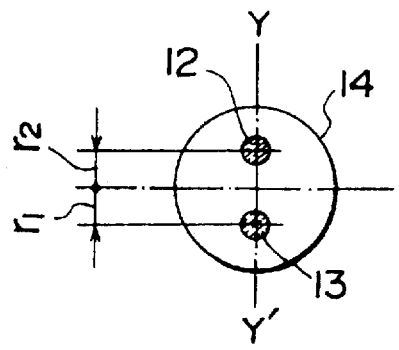
FIGS. 14a and 14b show the relation of the optical fibers on the ferrule in the improved device of FIG. 13.
Figure 14B:
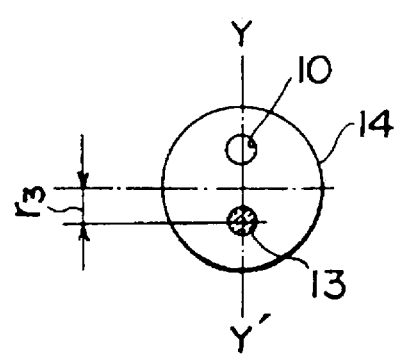

FIG. 7 shows a configuration of the second embodiment of the optical coupler built in accordance with the present invention. FIGS. 8a and 8b show the fabrication processes of the second embodiment. FIG. 9 shows the adjustment processes of the second embodiment.

In FIGS. 7 through 9, the ferrules $F_1$ and $F_2$, each having four optical fibers, are the same as those of the first embodiment in principle. The ferrule $F_1$ and $F_2$ are made of sintered zirconia ceramic materials, which are of a cylindrical structure. Each ferrule has no flange 17a for coupling the ferrules, unlike the first embodiment of the invention. Graded index rod lenses 281 and 291 and thin film 301 are the same as those of the first embodiment in basic structure. The outer diameters of the cylindrical bodies 171 of the ferrules $F_1$ and $F_2$ are to be precisely the same as those of the graded index rod lenses 281 and 291 within a tolerance of 2 µm. Since the throughhole of each ferrule should have an inner diameter (d) of 303 µm (d=303 µm) at the center thereof, the diameter ($d_1$) of each optical fiber element should be determined in accordance with the following expression.

$$d=(2^{1/2}+1)d_1+\delta$$

If diameter $d_1$ of each optical fiber element is nominally 125 µm ($d_1$=125 µm) when the inner diameter d of the throughhole of the ferrule end-face at the center thereof is nominally 303 µm (d=303 µm), the allowance $\delta$ for errors should be 3 µm or less ($\delta \leq 3$ µm).

The fabrication and adjustment processes of the second embodiment will be explained referring to FIGS. 8a, 8b, and 9.

As shown in FIG. 8b, the second embodiment uses a V-grooved block 261 wherein the V-groove 261a is provided for aligning in angle and radius the central axes of the ferrules, each having four optical fibers, to the optical axes of the graded index rod lenses. The graded index rod lenses 281 and 291 are provided at the center of the block 261 containing the V-groove 261a. A glass sheet 301 having on one side a thin film coating to act as a half mirror is inserted at the interface between the graded index rod lenses 281 and 291.

A cylindrical body 171 of the first ferrule $F_1$ with four optical fibers and the graded index rod lens 281 are mounted on the V-groove 261a so that the end-face of cylindrical body 171 of the first ferrule $F_1$ with four optical fibers contacts the outer end-face of the first graded index rod lens 281. The cylindrical body 171 of the first ferrule $F_1$ is then aligned to the graded index rod lens 281 and fastened there.

As shown in FIG. 9, the end-face of the second ferrule $F_2$ with four optical fibers contacts the outer end-face of the second graded index rod lens 291, and then the ferrule $F_2$ is aligned to the second graded index rod lens 291.

Since the diameters of first and second ferrules $F_1$ and $F_2$ are the same as those of the first and second graded index rod lenses 281 and 291, the central axes of these components are aligned by this step of the process.

Ferrule $F_2$ is rotated with respect to ferrule $F_1$ until the optical axis of each optical fiber in ferrule $F_1$ agrees with that in ferrule $F_2$ so that the optical axis of each optical fiber in ferrule $F_1$ or $F_2$ is symmetrical with respect to the optical axes of the graded index rod lenses. The ferrules $F_1$ and $F_2$ are to be fastened to the graded index rod lenses. The optical axes of the ferrules $F_1$ and $F_2$ have been aligned at this step.

The first ferrule $F_1$ with four optical fibers, the first graded index rod lens 281, the second graded index rod lens 291, and the second ferrule $F_2$ with four other optical fibers are arranged in a line and fastened to construct the optical coupler of FIG. 7.

The optical coupler can be operated while mounted on V-grooved block 261.

U.S. Pat. No. 4,989,946 discloses a ferrule whose throughhole contains both a two optical fiber end-face and a seven optical fiber end-face. The diameter of the throughhole of the ferrule into which two optical fiber end-faces are inserted is twice that of the optical fiber.

Assume that the inner diameter of the ferrule is dw, the diameter of the optical fiber is $d_1$, and the error between the diameter of the throughhole of the ferrule and the diameter of the optical fiber is $\delta w$. Then, dw=$2d_1+\delta w$ holds for them. If $\delta w$=3 µm, the angular error between the pair of optical fibers is 12.5 degrees for a ferrule and 25 degrees for a pair of ferrules. These ferrules cannot be used in the present invention.

An angular error of 0.004 degree is stated in the embodiments of the present invention.

Expression dw=$3d_1+\delta w$ is valid for the ferrule containing 7 optical fibers, which is disclosed in the aforementioned patent specification. The fabrication of the ferrule containing 7 optical fibers is difficult because 7 optical fibers cannot easily be aligned.

As described heretofore, the optical coupler built in accordance with the present invention provides a throughhole into which four optical fibers are fastened. The optical coupler can be built in the same manner as the optical connector of conventional type, and no special skill is needed for fabricating the assembly. The number of steps of the fabrication and adjustment process is drastically reduced. Offsets in optical axes between the respective optical fibers and graded index rod lenses can be reduced to the order of 1 to 2 µm, if one of the paired ferrules, each having four optical fibers, is properly rotated with respect to the other ferrule during the alignment. Offsets in the order of 1 to 2 µm are the same as those of the optical connectors of conventional types.

If the V-grooved block is used in the alignment, the angular and radial adjustment can easily be accomplished. After the alignment is carried out using the V-grooved block, the optical coupler can be operated without the use of the V-grooved block, or together with the V-grooved block while the optical coupler is fastened to the V-grooved block.

Epoxy resin will degrade when exposed to a strong light beam, i.e., a laser light beam, therefore epoxy resin cannot be used to maintain optical paths. This invention eliminates the performance degradation of the optical coupler due to the fatigue of the epoxy resin, because it is not used.

A variety of modifications of the aforementioned embodiments are within the scope of the present invention. Examples of optical couplers have been demonstrated in conjunction with ferrules with four optical fibers. This type of ferrule with four optical fibers can be coupled with any other ferrule with four optical fibers. In this case, the outer diameter of the other optical component to be coupled with the ferrule with four optical fibers is required to be the same as that of the ferrule with four optical fibers.

What is claimed is:

1. An optical coupler, comprising:
   first and second optical fiber ferrules, each of said ferrules having a cylindrical body, a central axis, an end-face perpendicular to said central axis, a throughhole at the center of the end-face extending along the central axis, and four optical fibers, each having an optical axis, fastened within the throughhole;
   first and second graded index rod lenses, each of said graded index rod lenses having a cylindrical body, an optical axis, a first end facing the first end of the other graded index rod lens, and a second end adjacent to the end-face of said ferrule;
   a thin film located between the first ends of said first and second graded index rod lenses which partially transmits incident light and reflects the remainder of the light; and
   fastening means for locating said thin film at the interface between the first ends of said first and second graded index rod lenses, for connecting the end-face of said first ferrule to the second end of said first graded index rod lens, for connecting the end-face of said second ferrule to the second end of said second graded index rod lens, for aligning the central axes of said first and second ferrules to the optical axes of said first and second graded index rod lenses, for aligning the optical axis of each optical fiber in said first ferrule to an optical axis in a corresponding optical fiber in said second ferrule by rotating said second ferrule around its optical axis so that the four optical fibers of said second ferrule are symmetrically arranged with respect to the optical axis of said second graded index rod lens, and for fastening together said first and second ferrules, said first and second graded index rods lenses and said thin film.

2. An optical coupler as claimed in claim 1, wherein said thin film transmits light power at a first wavelength ($\lambda_1$) and reflects light power at a second wavelength ($\lambda_2$) when light incident on one of said first and second graded index rod lenses contains light power at both first and second wavelengths ($\lambda_1+\lambda_2$).

3. An optical coupler as claimed in claim 1, wherein four optical fibers are used in said first ferrule and two of the four optical fibers are used in said second ferrule so that a 1×2 circuit is formed.

4. An optical coupler as claimed in claim 1 wherein two of the four optical fibers are used in said first ferrule and one of the four optical fibers is used in said second ferrule so that a 1×2 circuit is formed.

5. An optical coupler as claimed in claim 1, wherein said thin film consists of multiple layers of dielectric material formed on the surface of a transparent sheet.

6. An optical coupler as claimed in claim 1, wherein said fastening means consists of a cylindrical sleeve for aligning the central axes of said ferrules, the optical axes of said graded index rod lenses, and the optical axes of the optical fibers in angle and radius.

7. An optical coupler as claimed in claim 6, wherein said ferrule further includes a flange for coupling said ferrule to said sleeve.

8. An optical coupler as claimed in claim 1 wherein said fastening means comprises a V-grooved block for aligning the central axes of said ferrules, the optical axes of said graded index rod lenses, and the optical axes of the optical fibers in angle and radius.

9. An optical coupler as claimed in claim 1, wherein the throughhole of each of said ferrules has a center line parallel to a reference line on said ferrule and a diameter related to the diameter of the optical fibers fastened within the throughhole by the following formula:

$$d=(2^{1/2}1)d_1+\delta$$

where
   d: Diameter of the throughhole at the center of the end-face of said ferrule,
   $d_1$: Diameter of the optical fiber, and
   δ: Allowance for error.

10. An optical coupler as claimed in claim 9, wherein the reference line to which the throughhole relates is on an outer cylindrical surface of said ferrule, the position of said graded index rod lens attached to said ferrule also relating to said reference line.

11. An optical coupler as claimed in claim 9, wherein the allowance for error is 3 m or less.

12. An optical coupler as claimed in claim 9, wherein the angular error between the optical fibers is substantially 0.004 degree.

13. An optical coupler as claimed in claim 9, wherein the inner diameter of the throughhole of said ferrule is substantially 303 µm and the outer diameters of the optical fibers are substantially 125 µm.

14. An optical coupler as claimed in claim 1, wherein said ferrule has a throughhole consisting of a first portion terminating at the end-face, a second portion having an opening larger than the first portion to accommodate optical fiber overcoats, and a third portion having a tapered surface with an angle of inclination of 15 degrees or less connecting the first and second portions.

15. An optical coupler as claimed in claim 1, wherein the outer diameters of the cylindrical bodies of said ferrules are substantially equivalent to the outer diameters of the cylindrical bodies of said graded index rod lenses.

* * * * *